(No Model.) 5 Sheets—Sheet 1.
C. C. VAN DER VALK.
DATE AND TIME STAMPING APPARATUS FOR TICKETS.

No. 588,668. Patented Aug. 24, 1897.

Witnesses
M. F. Boyle.
W. H. Green

Inventor
C. C. van der Valk
By Thomas Drew Stetson
Attorney (No Model.) 5 Sheets—Sheet 2.
C. C. VAN DER VALK.
DATE AND TIME STAMPING APPARATUS FOR TICKETS.

No. 588,668. Patented Aug. 24, 1897.

Witnesses
M. F. Boyle
W. H. Green

Inventor
C. C. van der Valk
By Thomas Spres Stetson
Attorney (No Model.)  5 Sheets—Sheet 3.
C. C. VAN DER VALK.
DATE AND TIME STAMPING APPARATUS FOR TICKETS.
No. 588,668.  Patented Aug. 24, 1897.
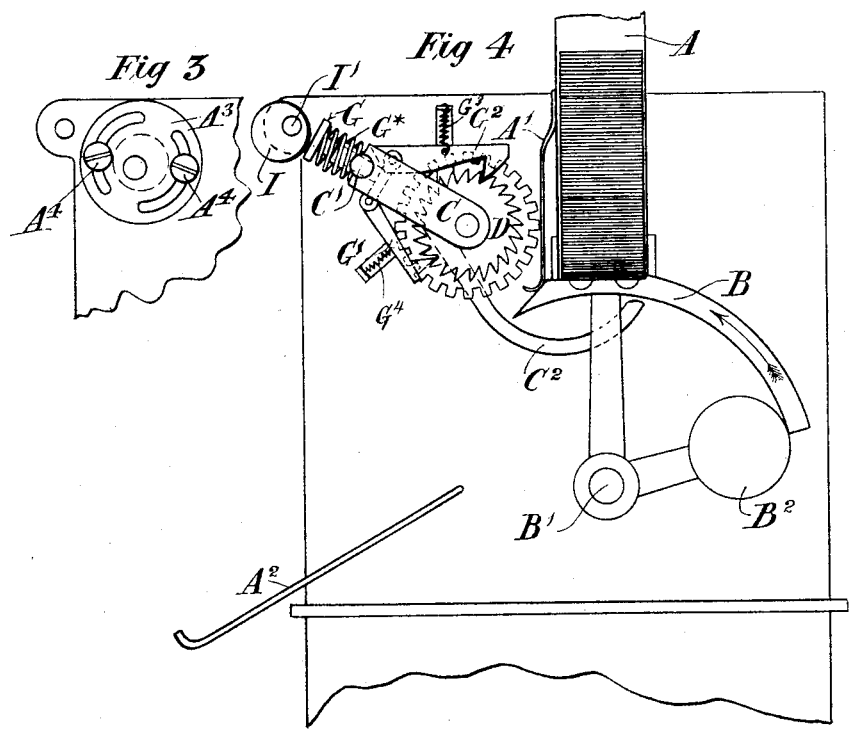
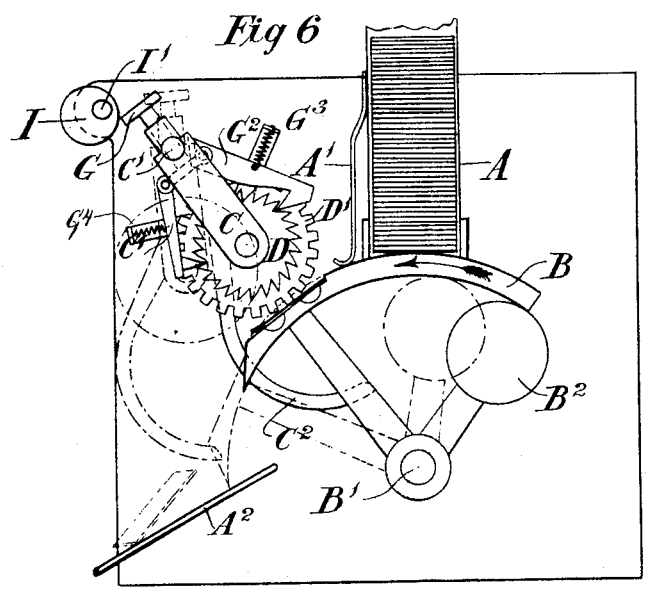
Witnesses
M. F. Boyle
W. H. Green
Inventor
C. C. van der Valk
By Thomas Spear Stetson
Attorney (No Model.) 5 Sheets—Sheet 4.
C. C. VAN DER VALK.
DATE AND TIME STAMPING APPARATUS FOR TICKETS.
No. 588,668. Patented Aug. 24, 1897.
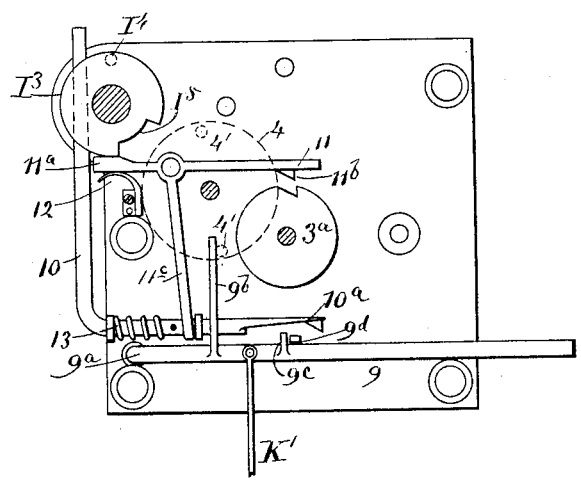
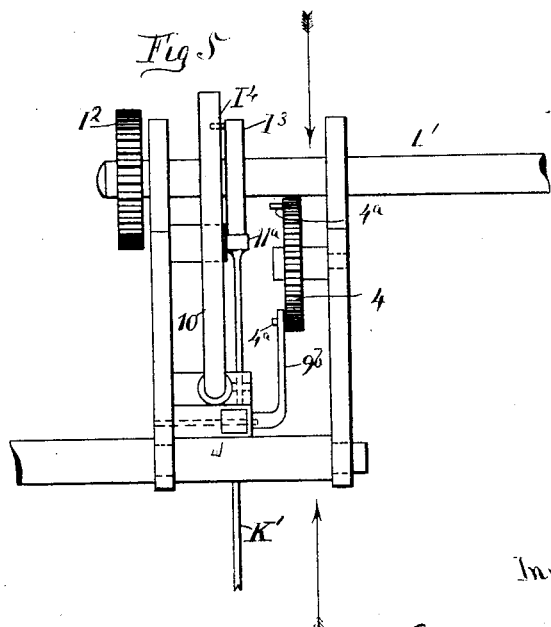
Witnesses
M. F. Boyle
J. B. Clautice
Inventor
C. C. van der Valk
By Thomas Drew Stetson
Attorney
THE NORRIS PETERS CO., PHOTO-LITHO., WASHINGTON, D. C.

(No Model.) 5 Sheets—Sheet 5.
C. C. VAN DER VALK.
DATE AND TIME STAMPING APPARATUS FOR TICKETS.

No. 588,668. Patented Aug. 24, 1897.

Witnesses
M. F. Boyle
J. B. Clautier

Inventor
C. C. van der Valk
By Thomas Drew Stetson
Attorney

UNITED STATES PATENT OFFICE.

CHRISTIAEM C. VAN DER VALK, OF HAARLEM, NETHERLANDS, ASSIGNOR TO THE SYNDICAAT TOT EXPLOITATIE DER PATENTEN C. C. VAN DER VALK, OF HAGUE, NETHERLANDS.

DATE AND TIME STAMPING APPARATUS FOR TICKETS.

SPECIFICATION forming part of Letters Patent No. 588,668, dated August 24, 1897.

Application filed August 22, 1896. Serial No. 603,568. (No model.)

*To all whom it may concern:*

Be it known that I, CHRISTIAEM CORNELIUS VAN DER VALK, a subject of the Queen of The Netherlands, residing at Haarlem, Netherlands, have invented a certain new and useful Improved Date and Time Stamping Apparatus for Tickets and the Like, of which the following is a specification.

This invention relates to an improved date and time stamping apparatus for tickets and the like, in which the ticket, &c., by the motion of a cylinder or segment thereof is taken from a receptacle and presented to the stamping-frame, which is correspondingly rolling, and is also actuated by the rotation of the cylinder, and in which the setting of disks in the stamping-frame carrying the relief type for marking the hour and the date is effected by toothed gearing controlled by an ordinary clock.

The invention also relates to a device combined with such a stamping apparatus, whereby should the apparatus be in use when the hour arrives the gearing actuating the disks cannot revolve until the parts are again free.

The construction of the said stamping apparatus is shown in the accompanying drawings, which form a part of this specification, in which—

Figure 1:
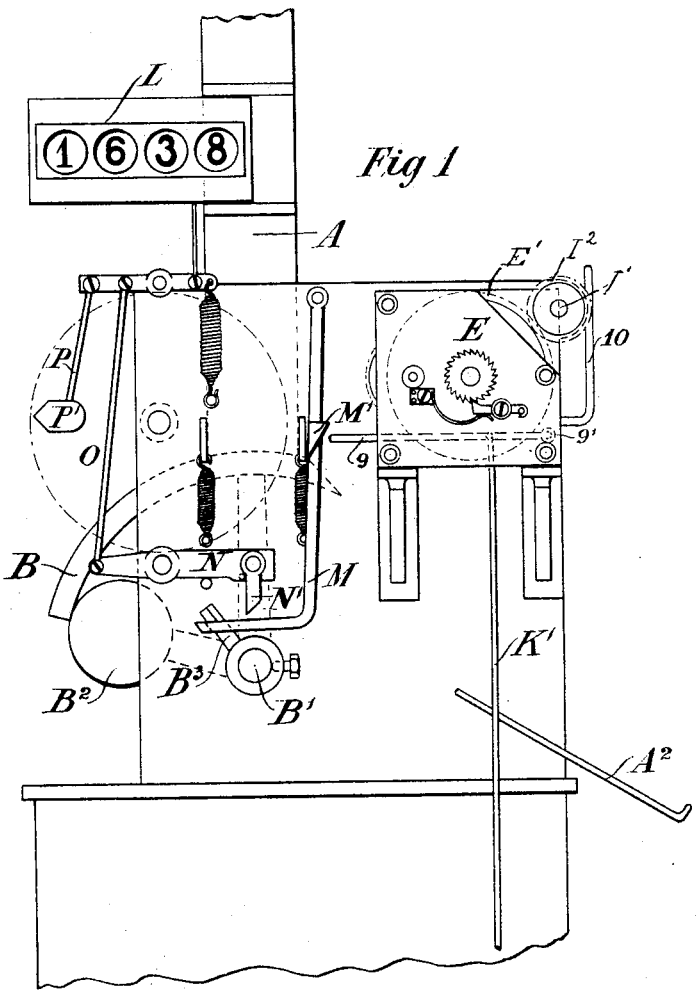
Figure 2:
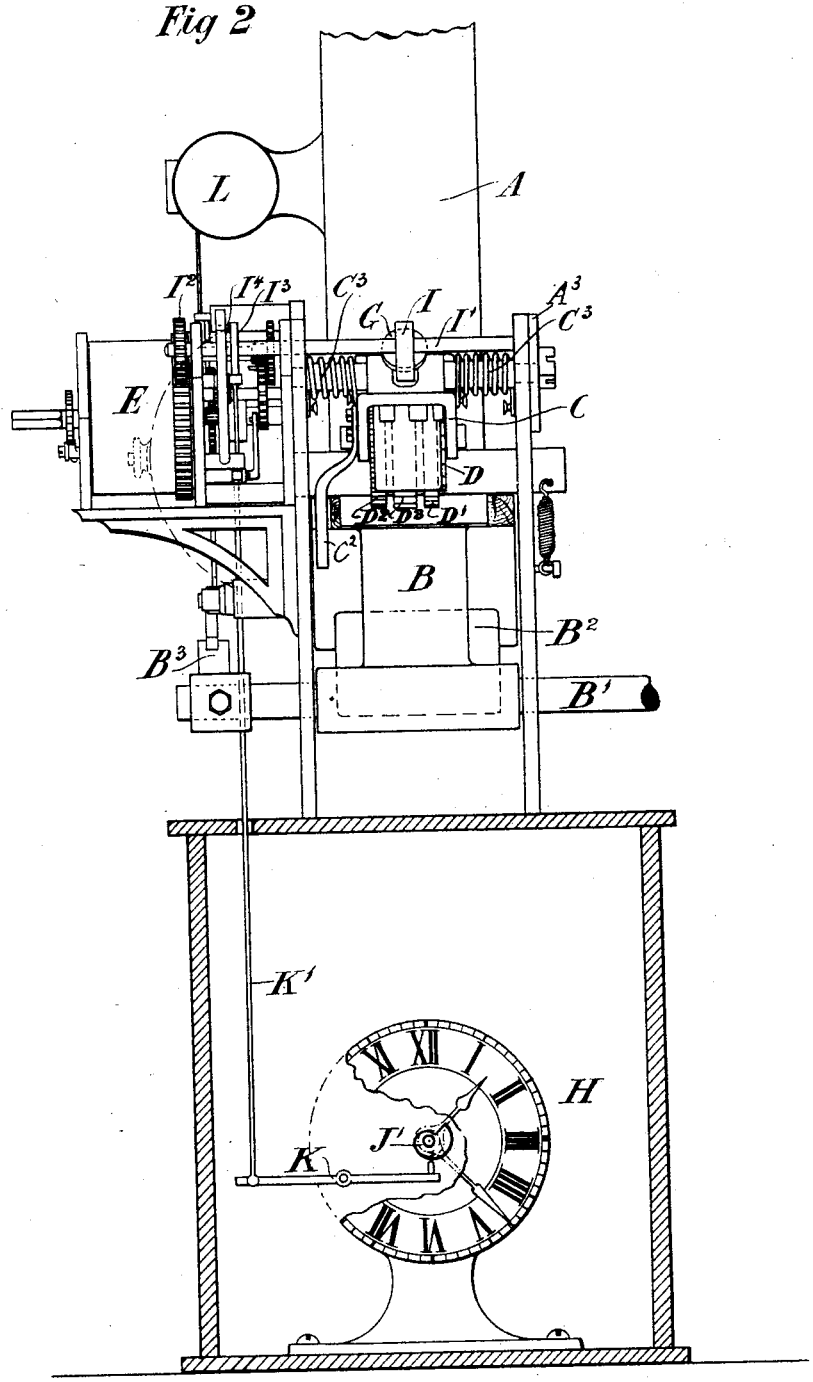
Figure 5A:
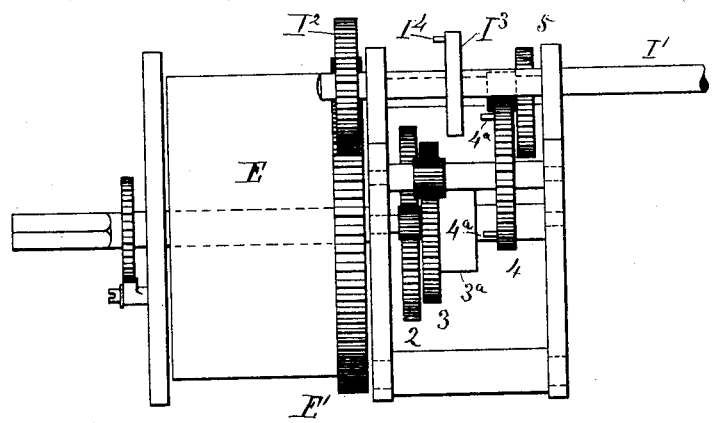
Figure 5B:
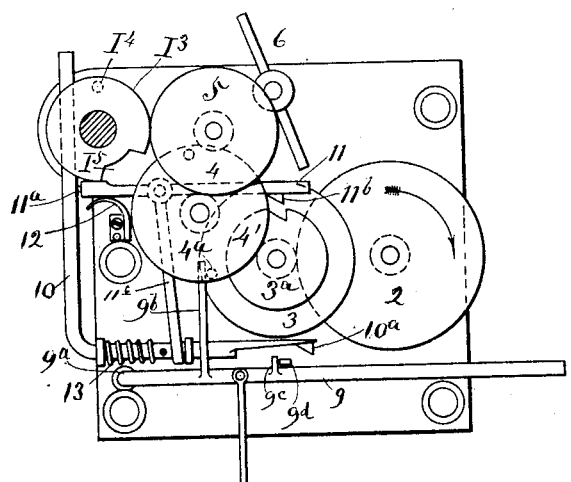

Figure 1 is a side view; Fig. 2, a front view, partly in section; Fig. 3, a detail; and Figs. 4 and 6 views of the stamping mechanism from the side opposite to that in Fig. 1. Fig. 4 shows it in the act of receiving a ticket and Fig. 6 in the act of stamping it. Figs. 5 to $5^c$ show the mechanism for setting the stamping-dies. Fig. 5 corresponds to Figs. 2 and $5^a$, with parts omitted to show more clearly the construction and action. Fig. $5^a$ corresponds to the view in Fig. 2 with certain parts removed. Figs. $5^b$ and $5^c$ are views from the right-hand side corresponding to Figs. 4 and 6, Fig. $5^b$ showing the nearly complete train of gearing and Fig. $5^c$ the same, but with certain parts removed.

Similar letters and numerals of reference indicate corresponding parts in all the figures where they appear.

Below a vertically-arranged case A, Fig. 4, which contains the tickets, &c., to be stamped, is arranged a cylindrical sector B, which I call the "cylinder," rotatable in the direction of the arrow. The cylinder B is formed with a shallow recess in its periphery, into which can enter the lowest ticket of the pile at each to-and-fro motion. The rocking of the cylinder may be effected by means of a handle (not shown) on the shaft $B'$.

At the side of the case A is arranged the stamping or printing frame C, pivoted at $C'$, and provided with a downwardly-projecting curved arm $C^2$, by means of which on the partial rotation of the cylinder B its front edge is made to act against the arm, so as to turn the stamping-frame on its pivot $C'$. Helical springs $C^3$ urge it into the rearward position as soon as released. There are provided gentle springs $A'$, which press upon the ticket lying in the recess of the cylinder and prevent it from falling out too soon.

A counterweight $B^2$ on the shaft $B'$ serves to insure that the cylinder B always tends to assume its original position.

The axis or shaft $C'$ of the stamping-frame C is mounted in eccentric-plates $A^3$, confined by screws $A^4$, (see Fig. 3,) so that by adjusting these plates the position of the stamp can be varied at will and thus the impression thereof be regulated as may be required. Within the fork of the printing-frame are arranged three disks of equal diameter. The periphery of the first disk $D'$ is divided into twenty-four divisions, and each of these carries in relief one of the hours one to twelve a. m. and one to twelve p. m. The periphery of the second disk $D^2$ is marked with thirty-one divisions, and each of these carries in relief the day of the month. The third disk $D^3$, situated in the middle between the other two, carries on its periphery the names of the several months of the year.

When the hour-disk $D'$ has completed one revolution, it effects, by any well-known means, the turning of the day-disk $D^2$ one division, and when the day-disk has completed one revolution a corresponding mechanism turns the month-disk $D^3$ one division.

The movement of the hour-disk is effected by a spring-motor which at the termination of every hour is set in motion by means of an ordinary clock H, Fig. 2, which effects one complete revolution of an eccentric I on a shaft I', Fig. 4. This eccentric I presses upon a slide G, carried in the stamping-frame C, which frame is by a pawl G' made to partially turn a ratchet-wheel D, fixed to the hour-disk D'. The slide G is then brought back to its original position, as at Fig. 6, by the helical spring G%, (see Fig. 4,) and a hook-pawl G² in this return motion completes the movement, so that this disk is turned through one of its twenty-four divisions. A spring G³, carried by the frame C, urges the hook-pawl G² into engagement with the ratchet-wheel D. There is a similar spring G⁴ performing the same duty for the pawl G'.

The motor actuating the eccentric I comprises a barrel E, containing a sufficiently-strong coiled spring, (not shown,) toothed wheels 2, 3, 4, and 5, Figs. 5ª and 5ᵇ, and fly 6, Fig. 5ᵇ.

A large gear-wheel on the main arbor of the barrel-motor is in mesh with a pinion on the shaft of wheel 2, by which gearing said wheel receives motion. The wheel 2 meshes with a pinion on the shaft of wheel 3, the latter with a pinion on the shaft of the wheel 4, wheel 4 with a pinion on the shaft of wheel 5, and the latter with a pinion on the fly-shaft.

The toothed ring E' of the barrel E gears with a toothed wheel I² on the operating-shaft I', which shaft also carries a disk I³, having a lateral pin I⁴ and a peripheral recess I⁵.

The clock H operates through the lever K and vertically-reciprocating rod K', a horizontal rod or lever 9, pivoted at 9', and an elbow-slide 10 and a horizontal lever 11, arranged as shown most clearly in Figs. 5ᵇ and 5ᶜ.

A wedge 10ª, Figs. 5ᵇ and 5ᶜ, at the end of the slide 10 is in the normal position made to bear against the left-hand side of a stud 9ᶜ, being pressed against the same by the force of the spring 13. The front end of the lever 11 carries on its upper face a swell or projection 11ª, adapted and aided by a gentle spring 12 to enter the notch I⁵ in the slide I³ when it is presented thereto, and a V-shaped projection 11ᵇ, near the back end of lever 11, is adapted to engage in a V-shaped notch in a disk 3ª, carried on the shaft of the toothed wheel 3. The engagement of the latter parts effectually arrests the motion of the train of mechanism until the lever 9 is sufficiently tilted upward by the action of the clock and the lever 11, through its connections, is urged out of the engaged position.

On the hourly rotation of a cam J', carried on the proper arbor of the clock H, the lever K is actuated to elevate the rod K' and raise the rod 9, Figs. 5ᵇ and 5ᶜ.

Still referring to Figs. 5ᵇ and 5ᶜ, the slide 10, guided to reciprocate horizontally forward and backward, is urged rearward, which is to the right, by the spring 13. This slide is held ordinarily in its extreme forward position by the engagement of its rear with a fixed stud 9ᵈ. As the end of the hour approaches the lever 9 is raised and a projection 9ᵉ on the same presses the wedge-shaped rear end 10ª of the slide 10 upward to detach it from the stud 9ᶜ, the adjacent portion of the slide 10 being elastic to allow of such deflection. So soon as detached the helical spring 13 moves the slide 10 rearward, causing it to assume the position shown in Figs. 5ᵇ and 5ᶜ. When said slide 10 is moved to the rear, as stated, the spring 13 also moves a dependent arm 11ᶜ of the lever 11 in the same direction, and thereby turns said lever 11 against the force of its spring 12 and raises the rear projection 11ᵇ out of the notch in the disk 3ª and depresses the front swell 11ª out of the recess I⁵ in the disk I³. The train of gearing, including the wheel 4, now rotates a little until one of the laterally-projecting pins 4ª bears against an arm 9ᵇ, projecting upward from the lever 9, and the movement is stopped with the parts in this position ready for the effective movement which is soon to be required. When the minute-hand of the clock, and consequently the offset cam J', have turned a little farther, the lever K will be released and will suddenly turn, allowing the lever 9 to sink down. By this means the arm 9ᵇ is withdrawn, so that the toothed wheel 4, and consequently the spring motor-drum E and its train of wheels, is set free, (see Fig. 5,) and the effective movement to change the type-wheels is made, the eccentric I being turned. During the motion the pin I⁴ on the disk I, acting on the long arm which extends upward from the slide 10 in the front, presses such slide forward again into its original position, (see Fig. 1,) allowing the inclined face of the wedge 10ª to ride over the stud 9ᵈ and to again engage and be retained thereby. So soon as the eccentric I has made one complete revolution the recess in the disk I³ is presented to receive the swell 11ª, and this permits the opposite end of the lever 11 to sink, so that the projection 11ᵇ engages in the notch in the disk 3ª and the motion stops. All the parts are now in the condition of readjustment, and at the expiration of another hour the above-described operation is repeated.

As it may happen that the stamp is being used when the time arrives for the motor to act I provide means whereby the operation of the gear is momentarily prevented from actuating the hour-disk. For this purpose a suspended pivoted bar M (see Fig. 1) is provided, which engages by its lower bent end with the arm B³ of the shaft B'.

When the cylinder B is at rest, the rod or bar M is held by the arm B³. As soon, however, as the cylinder turns the rod M will be set free. If now during this time the rod 9 is raised by the clock H, this rod bears upon a projection M' of the rod M and cannot descend again until the cylinder B is again in its normal position and the rod M is drawn back by the arm or carrier B³.

The shaft arm or carrier B³, each time that the cylinder B approaches its end position, effects the sounding of a bell by means of levers N P and rod O, the bell being shown in dotted lines, and simultaneously actuates a registering mechanism L, which may be of any ordinary or suitable construction, to indicate the number of tickets stamped.

The action of the above-described apparatus is as follows: I will assume that the cylinder B is in the position of rest, Fig. 4, in which its recess is directly underneath the case A containing the tickets. If it be now turned around, it will, by means of the curved arm $C^2$, also turn the stamping-frame C, which will thereby impress the proper devices upon the ticket as it is carried past in the recess of the cylinder, as shown at Fig. 6. On the further rotation of the cylinder B the curvature of the arm C causes the stamping-frame to turn faster than the cylinder, (see the dotted position, Fig. 6,) so that the stamped ticket is set free and falls into the chute $A^2$. The arm $B^3$, striking the lever N in the return motion of the cylinder B, tilts the lever, moves the hammer P', and causes the bell to be sounded, thus giving a signal that the operation is completed and the cylinder B is now back to its original position.

It will be understood that the beveled contact-piece N' on the lever N is pivoted so as to swing partly to the right and be effective in giving motion to the hammer only on the backward movement of the arm $B^3$. The wheel D and the disks D' $D^2$ $D^3$ are thus actuated by the clock each hour through the toothed gear, so that each ticket treated receives correctly the proper date and time stamp.

I claim as my invention—

1. In combination, a receptacle containing the tickets to be stamped, a cylinder or segment connected as shown, and provided with a recess corresponding to the tickets, a pivotally-suspended stamping-frame carrying disks upon the peripheries of which the date-marks are provided in relief, and mechanism by a clock adapted to change the disks, substantially as herein specified.

2. In combination, a receptacle A open at the bottom, for holding the tickets to be stamped, a rotary cylinder B arranged below said receptacle and provided with an opening or recess, a pivotally-suspended stamping-frame C carrying a series of disks, a curved arm $C^2$ fixed to said stamping-frame, and a train of mechanism controlling the adjustment of the disks, substantially as herein specified.

3. In combination, a receptacle A open at the bottom, for containing the cards to be stamped, a rotary cylinder B provided with an opening or recess, a counterweight $B^2$ mounted on the cylinder-shaft, a pivotally-suspended stamp C, an arm $C^2$ fixed to said stamp and a train of mechanism arranged to act through suitable means upon the hour-disk of the stamp, and a pivotally-suspended lever M, an arm $B^3$ on said cylinder-shaft for vibrating the lever M and provided with a shoulder M', and a controlling-lever 9 through which the shoulder engages the train of mechanism and prevents the change of dates when the stamp C is in use, substantially as herein specified.

In testimony whereof I have hereunto set my hand at Rotterdam, The Netherlands, this 27th day of July, 1896, in the presence of two subscribing witnesses.

CHRISTIAEM C. VAN DER VALK.

Witnesses:
MARGARET REQUE,
SIGURD S. REQUE.